Figure 1:
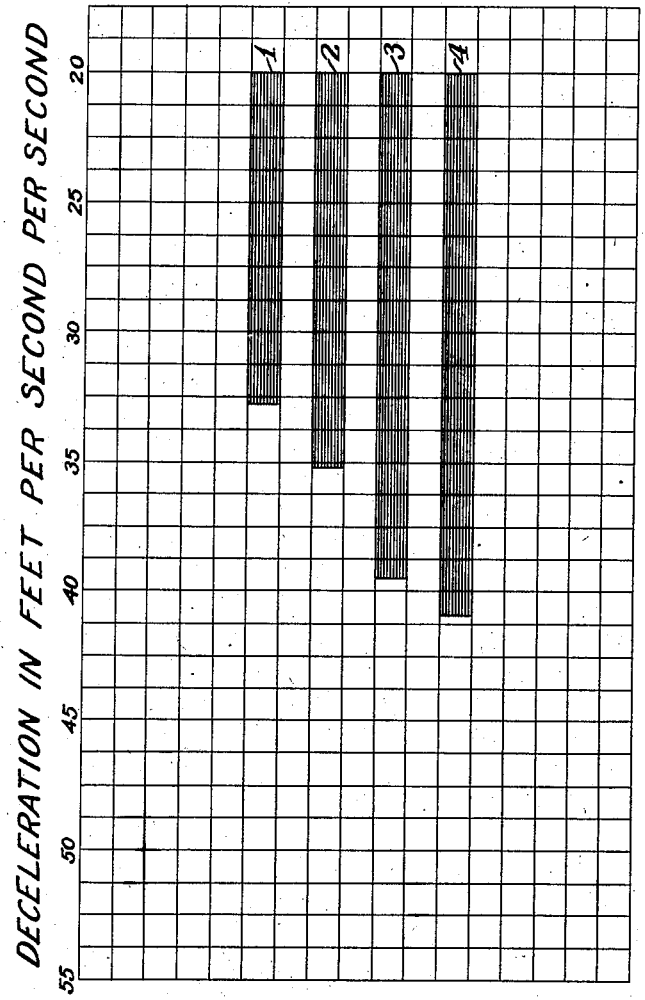

Dec. 25, 1945.　　C. S. HART ET AL　　2,391,416
FRICTION ELEMENT
Filed May 17, 1943　　3 Sheets-Sheet 1

Inventors:
Clinton Sheldon Hart
and Ray E. Spokes
By Wallace and Cannon
Attorneys Dec. 25, 1945. C. S. HART ET AL 2,391,416
FRICTION ELEMENT
Filed May 17, 1943 3 Sheets-Sheet 2

Inventors:
Clinton Sheldon Hart
and Ray E. Spokes
By Wallace and Cannon
Attorneys Dec. 25, 1945.   C. S. HART ET AL   2,391,416
FRICTION ELEMENT
Filed May 17, 1943    3 Sheets-Sheet 3

Inventors:
Clinton Sheldon Hart
and Ray E. Spokes
By Wallace and Cannon
Attorneys Patented Dec. 25, 1945

2,391,416

UNITED STATES PATENT OFFICE 2,391,416

FRICTION ELEMENT

Clinton Sheldon Hart, Northfield, Minn., and Ray E. Spokes, Ann Arbor, Mich., assignors to American Brake Shoe Company, Wilmington, Del., a corporation of Delaware Application May 17, 1943, Serial No. 487,234

4 Claims. (Cl. 106—36)

This application is a continuation in part of our application, Serial No. 376,056, filed January 27, 1941.

This invention relates to friction elements and the like such as brake linings and clutch facings and more particularly to composition friction elements that usually consist of asbestos, friction-controlling and imparting ingredients and a bond, usually of organic material, and the invention, in its more specific aspects, relates to a bond that is not only useful in such composition friction elements and the like but also in the impregnation of woven or felted materials used as friction elements and the like.

Among the organic materials that have been employed heretofore as bonds in friction elements are vegetable drying oils in their raw or natural state and in various modified forms. Thus, both raw and double-boiled linseed oil have been employed and raw and hydrogenated China-wood or tung oil has been used. Furthermore, heat-polymerized drying vegetable oils have been used and the most satisfactory of these has been so-called purely polymerized linseed oil, that is, linseed oil which is substantially free from oxidized oil and has been heat-polymerized (prior to use as a bond) at an elevated temperature while being subjected to high vacuum and while having carbon dioxide or other inert gas passed therethrough to free the oil of free fatty acids and other volatile products formed in the oil during the heat-polymerization thereof. Oil so processed has a relatively low free fatty acid content because substantially all of the free fatty acids, such as linoleic and linolenic, and other volatile matter formed in the oil during the heat-polymerizing operation are removed as formed by reason of the high vacuum under which the operation is carried out and the agitation to which the oil is subjected, by the passage of inert gas therethrough, during the heat-polymerizing operation.

An appreciable portion of most friction elements and the like is asbestos which, if released or freed from the elements during the use thereof, may be subjected to such temperature that it will be dehydrated and thereby be rendered abrasive, and this has the effect of producing a marked increase in the frictional characteristics of the elements. For example, where friction elements are used in the brakes of automotive vehicles and the like, the brakes are adjusted to effect deceleration at a rate predicated upon the normal frictional properties of the elements and if asbestos and other fillers capable of increasing friction are released, with the effect of increasing the friction, the braking action is impaired often with detrimental results, such as squealing during brake operation, or other objectionable effects. Moreover, kindred effects may accrue if, for example, friction-imparting ingredients contained in composition friction elements are released or freed therefrom in the course of use of the elements.

An important function of the bonds of composition and other friction elements is to prevent the release of asbestos and other ingredients, included in the elements, in the course of use thereof, thus preventing the accrual of the above explained and like detrimental effects and thus also insuring that the elements will wear away uniformly in use. It will be appreciated, however, that the organic materials that may be employed as bonds in friction elements and the like are subject to disintegration when subjected to relatively high temperatures. Frequently friction elements are called upon to dissipate appreciable quantities of heat in the course of use thereof and this may result in disintegration of the bonds thereof. For example, those friction elements that are employed in the brakes of automotive vehicles and the like are frequently called upon, in the course of deceleration effected thereby, to dissipate, in the form of heat, appreciable kinetic energy and in such instances there will be a build-up in the temperature at which heat disintegration of the bonds will occur may be frequently be approached, if not passed, and this may give rise to the accrual of the detrimental effects hereinabove discussed.

It is generally recognized that it is advantageous to maintain the frictional characteristics of friction elements uniform throughout each period of operation thereof, as for example, throughout each deceleration effected by friction elements employed in the brake couples of automotive vehicles and the like, but where this is attempted in those instances in which appreciable quantities of kinetic energy need be dissipated in the form of heat, it has been found that the maintenance of substantially uniform frictional characteristics throughout each period of operation of friction elements contributes to an increase in temperature as an operation proceeds. Also in those instances where this results in the increase of temperature to a point approaching or passing the heat disintegration temperature of the organic material employed as a bond, actual combustion of the bond may occur so that its bonding properties are impaired with the result that ingredients of the elements are released in such a way as to produce a marked increase in the frictional properties of the elements with the detrimental effects hereinabove described. Moreover, not only may disintegration of the bond arise from combustion thereof at the working surface of a friction element in the course of a particular operation of the element but such disintegration may be accumulative, which is to say, disintegration may be slightly initiated in the course of one operation and as additional operations are effected further disintegration occurs. In such instances the disintegration may penetrate well below the working or friction surface of the element. The ultimate result of such accumulative disintegration and particularly in friction elements employed in brakes of automotive vehicles and the like is that a "grabby" condition may arise and cause jerky or spasmodic operation of the brakes, objectionable vibration and attendant noise may arise, and the useful life of the friction elements is materially shortened.

While it is known that the presence of a lubricating effect in friction elements will materially mitigate such objectionable increases in temperature in the course of each of the operations effected by friction elements, it has not heretofore been possible to afford such desirable lubrication where the bond has been relied upon to afford the lubrication for the reason that if under-curing of the bond was relied upon to afford the lubricating effect, friction elements so bonded have not proven to be satisfactory because they have been structurally weak and were prone to bring about, where the elements were employed in the brakes of automotive vehicles and the like, a condition known as "fade-out" which substantially amounted to the failure of the friction elements to perform their intended function. However, we have found that if a heat-polymerized vegetable drying oil having a relatively high free fatty acid content formed in situ and retained therein during the heat-polymerizing operation is employed as a bond in friction elements, desired mechanical strength is realized and also a controlled lubricating effect may be produced in the course of each period of operation of the elements and particularly in the later stages of the period of operation so that as each operation proceeds and the temperature rises, the kinetic coefficient of friction of the elements so bonded is reduced and so to do is an important object of the present invention.

It is frequently necessary that friction elements which are employed to line the brakes of automotive vehicles and the like, such as passenger cars and light trucks, possess sufficient flexibility to enable the elements to be conformed to the shoes or other supports on which they are mounted. Moreover, such lining is frequently supplied in strip form and is coiled into rolls of from about twelve to about twenty-four inches in diameter and containing about twenty-five feet of lining. Hence, it is necessary that such lining possess sufficient flexibility to enable it to be coiled into such rolls. Such degree of flexibility and other desirable properties may be imparted to friction elements, such as brake lining of the aforesaid character, by employing as the bond thereof a vegetable drying oil which is highly viscous and posesses a certain amount of tackiness when it is mixed with other ingredients, such as asbestos and friction-controlling and imparting ingredients from which such elements are compounded, and such oil is cured to a solid state by subjecting the intermixed and properly shaped ingredients to heat and usually the oil is sulphurized to facilitate cure thereof to such solid state. We have found that vegetable drying oils converted to a highly viscous and tacky condition by being subjected to temperatures of 500° F. to 600° F. under carefully controlled conditions in which water and other volatile products of the heating operation including acrolein are removed from the oil and in which gel formation and the formation of what are aptly called "hot spots" are avoided, and in which the fatty acid content of the oils is increased and retained, may be employed as bonds in composition friction elements and the like to realize the aforesaid and other desirable conditions and so to do is still another important object of the present invention.

It should be noted, however, that the heat-polymerized oil that is to be used in accordance with the present invention will need be soluble in petroleum naphtha or the like for otherwise proper dispersion of oil heat-polymerized sufficiently to be useful in this invention could not be realized, and thus it is still another object of this invention to employ as the bond of friction elements and the like a heat-polymerized highly viscous and tacky oil of the character above described but which is soluble in petroleum naphtha or the like.

Other and further objects of the present invention will be apparent from the following description and claims. A preferred embodiment of the principles of this invention and what we now consider to be the best mode in which we have contemplated applying those principles is described hereinafter. However, other embodiments of the invention embodying the same or an equivalent principles may be used and changes may be made as desired by those skilled in the art without departing from the present invention and the purview of the appended claims.

Figure 2:
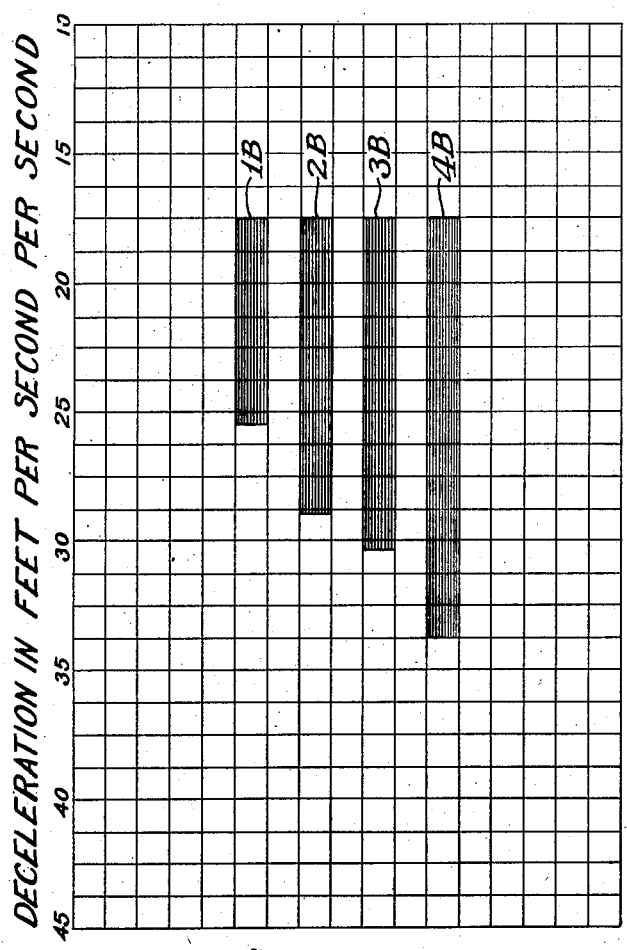
Figure 3:
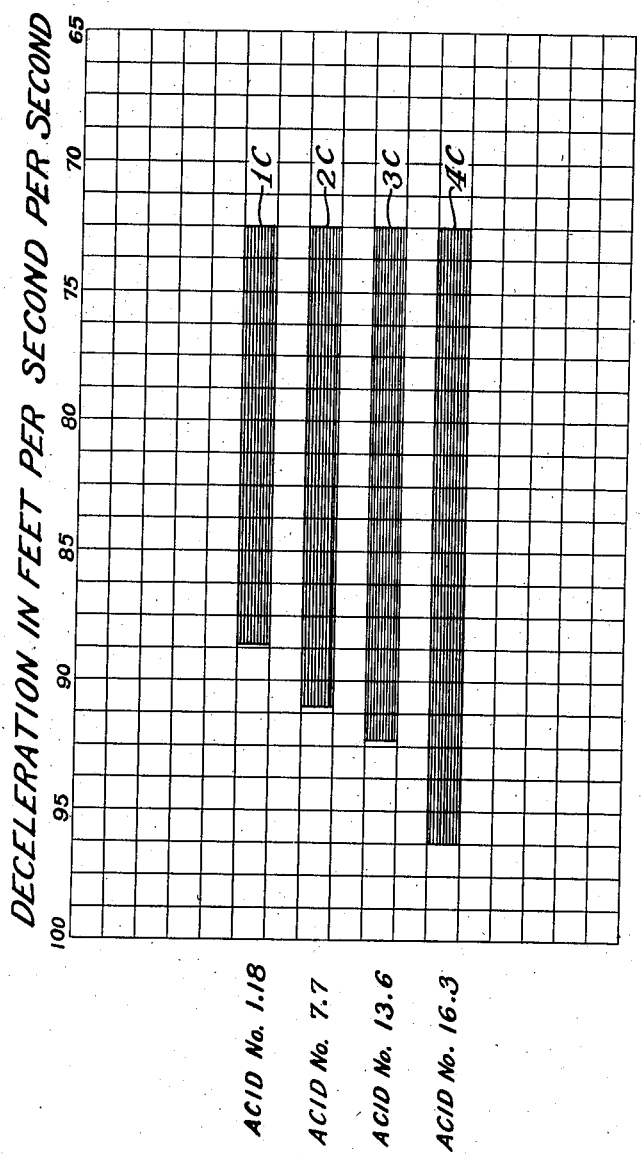

In the accompanying drawings, Figs. 1, 2 and 3 are graphs of the results of comparative tests of certain friction elements, selected of which embodied the present invention and others of which did not embody the present invention, and wherein, therefore, certain of the advantages of and certain of the novel results realized from the present invention are graphically set forth.

Among the heat-polymerized vegetable drying oils having a relatively high free fatty acid content that may be used as the bond for friction elements and the like within the purview of our invention are both raw and refined linseed oils which have been heated to a temperature and for a period of time sufficient to be rendered highly viscous and tacky.

A specific example of such an oil is raw linseed oil that has been heated under carefully controlled conditions to a temperature of about 590° F. for a period of about eight hours. However, the oil that is employed in the practice of our invention may be any vegetable drying oil, as for example, linseed or perilla oil, which has been heated under carefully controlled conditions at a temperature of not substantially less than 500° F. nor substantially more than 600° F. and for a period of time (usually not substantially in excess of ten hours) sufficient to render the oil highly viscous and tacky without gel formation and to assure that it will have an acid number (due to the fact that substantially all of the free fatty acid content formed in the oil during the heat-polymerizing operation has been allowed to remain or has been retained therein as formed) of not substantially more than 20.0 and also so as to have a viscosity not substantially in excess of about 430,000 centipoises at a temperature of about 26.7° C. The foregoing are aproximately the upper limits of acid number and viscosity which it is possible to obtain in a heat-polymerized vegetable drying oil (linseed) while still retaining complete solubility of the oil in a petroleum thinner, such as petroleum naphtha, and, at the same time, avoiding excessive decomposition of the oil. However, the preferred viscosities and acid numbers of the heat-polymerized vegetable drying oils found useful as bonding agents in friction elements are, as indicated in the accompanying Examples Nos. 1 and 2, and by the friction elements tested, and the results of which are shown in the graphs in Figs. 1, 2 and 3, somewhat below the aforesaid upper limits of acid number and viscosity.

It is to be noted, in this connection, that if an oil of the aforesaid character has not been heat-polymerized or bodied for a sufficient length of time, which will be indicated by its acid number and viscosity, the resulting viscosity and tackiness of the oil will not be such as to assure good bonding properties and structure in friction elements bonded thereby, and especially flexible friction elements, such as brake lining afforded in roll form. Moreover, in the use of such friction elements there is apt to occur an undesirable increase or build-up in friction rather than a desired lubricating effect.

The acid number of a heat-polymerized vegetable drying oil of suitable viscosity to be useful as a bonding agent in friction elements in the practice of the present invention should be substantially in excess of 2.5 which is approximately the upper limit of the acid number of the so-called purely (heat) polymerized vegetable drying oils heretofore employed as bonding agents in friction elements.

It is important that a vegetable drying oil, such as linseed or perilla, to be useful in accordance with this invention, the viscosity and tackiness thereof be sufficiently high to enable the oil to properly bond the various ingredients usually included in composition friction elements and in this connection it is to be noted that if such viscosity and tackiness are afforded in the oil by the heat-polymerization thereof, then the acid number of the oil will be sufficiently high to enable the advantageous and novel results of this invention to be realized, provided that the heat-polymerization of the oil is carried out under the carefully controlled conditions hereinabove described and the free fatty acids formed during the heat-polymerization are in the main retained in the oil as they are formed.

While a wide variety of composition friction elements or the like may be compounded by the use of the novel bond of this invention and while this bond may be used as an impregnant for felted or woven materials to afford friction elements or the like, the following is an example of a formula that may be followed to afford flexible composition friction elements, such as the brake lining in roll or strip form discussed hereinabove, all parts indicated in the formula being by weight:

Example No. 1

| | Parts |
|---|---|
| Asbestos | 65 |
| Pyrobituminous material (pulverized) | 20 |
| Heat-polymerized linseed oil containing substantially all of the free fatty acid content formed therein during the heat-polymerizing operation and having and acid number of 12.3 and a viscosity of 53,000 centipoises at 26.7° C | 15 |
| Sulphur | 3 |
| Solvent | 7 |

In compounding friction elements according to the foregoing example, the bond specified therein, which in this instance may be raw linseed oil that has been heated under carefully controlled conditions at a temperature of about 590° F. for a period of about eight hours, is dissolved in the solvent, which may be a petroleum thinner, such as petroleum naphtha, having an end point not substantially greater than 400° F., and thereafter the other ingredients specified are introduced into the dissolved bond and the various ingredients such as the asbestos and the pulverized pyrobituminous material, which may be bituminous coal, are thoroughly intermixed until a uniform dispersion of the bond throughout the other ingredients is attained. Thereafter the mixture is formed into suitable shapes and these shapes are then cured in a suitable oven wherein the shapes are subjected to gradually increasing temperatures for a period of time sufficient to effect the cure, as for example, for about eighteen hours at temperatures increased from time to time from about 180° F. to about 325° F., this cure converting the bond to a solid state, the inclusion of sulphur as specified in Example No. 1 being for the purpose of sulphurizing the oil to facilitate conversion thereof into a solid state.

It will be understood that various ingredients other than those specified in Example No. 1 may be incorporated in composition friction elements but inasmuch as this invention primarily pertains to the bond employed in such elements and since the practice of including such other ingredients is well understood in the art, further examples of composition friction elements of this character are not included herein.

However, it may be desirable in some instances to modify the physical characteristics of the bond for the purpose of molding or extruding by imparting to such bond a greater degree of tackiness by adding to the oil, or by substituting for a relatively small fraction thereof, a modifier, such as the polymer from the liquid obtained from the destructive distillation of cashew nut shells, or a relatively small fraction of an oil modified phenolic-aldehyde type resin. Thus, a typical example of a formula that may be followed in compounding a composition friction element including a bond of the aforesaid character is the following in which all parts indicated are by weight:

Example No. 2

| | Parts |
|---|---|
| Asbestos | 65 |
| Pyrobituminous material (pulverized) | 20 |
| Heat-polymerized linseed oil containing substantially all of the free fatty acid content formed therein during the heat-polymerizing operation and having an acid number of 12.3 and a viscosity of 53,000 centipoises at 26.7° C | 13 |
| Oil modified phenolic-aldehyde resin | 3 |
| Sulphur | 3 |
| Solvent | 7 |

In compounding friction elements according to Example No. 2 a process much like that hereinabove described with specific reference to Example No. 1 is followed, except in this instance both the polymer and the heat-polymerized linseed oil, which in this instance may again be raw linseed oil which has been heated under carefully controlled conditions at a temperature of about 590° F. for a period of about eight hours, are both dispersed in the solvent specified prior to intermixture thereof with the other specified ingredients. It will also be understood, as in the case of Example No. 1, that various other ingredients may be included in the composition for the purpose of imparting desired characteristics or for the purpose of controlling the frictional characteristics of the elements, all as well understood in the art.

The advantageous and novel results which may be realized from practice of the present invention may be explained, in part, by reference to the accompanying graphs wherein the performance of friction elements compounded from ingredients such as those specified in Example No. 1 but including a variety of bonds, as explained hereinafter, is depicted.

The tests of which the results are graphically shown in Figs. 1, 2 and 3 were conducted on a dynamometer testing machine wherein friction elements compounded as aforesaid were secured to the shoes of a brake couple included in the machine. The decelerations involved in the tests were made under uniform test conditions in the machine and were effected by forcing the friction elements or lining on the shoes into engagement with the rotating member of the brake couple by hydraulically-operated means, the variables in the tests such as the hydraulic pressures entailed in effecting the decelerations and the speeds from which the decelerations were effected being explained in detail hereinafter and as reference is made to the various graphs. In this regard it should be noted that in conducting tests, such as those to which the graphs pertain, on a dynamometer testing machine there may be variations in readings taken at different times under identical test conditions, attributable, as is well understood, to the inherent characteristics of the entailed mechanical devices and other related circumstances. Thus, in considering the accompanying graphs and the following discussion thereof it should be remembered that these graphs illustrate the average of repeated tests and show a trend toward a particular result rather than specific conditions which may be exactly duplicated time after time.

In order to eliminate variable factors, as far as possible, all of the heat-polymerized oils which were employed as bonding agents in the friction elements tested, and the results of which tests are shown graphically in Figs. 1, 2 and 3, had substantially the same viscosity under similar temperature conditions, and, except for differences in the bonding oils employed, the friction elements tested were otherwise identical in composition. All of the bonding oils employed had been heat-polymerized until they were highly viscous and tacky but substantially free of gel formation while being completely soluble in a suitable volatile solvent such as petroleum thinner. Extraneous temperature variations, which might otherwise have been encountered, were eliminated by maintaining the operating temperatures of the friction elements tested substantially constant or uniform. This was done by maintaining the air surrounding the brake couple at a substantially constant atmospheric temperature of 70° F. Hence such changes of temperature as occurred during the tests upon the friction surface of the friction elements, and internally thereof, were due to the friction characteristics of the friction elements tested and not to extraneous factors and the results shown by the graphs represent, therefore, the effect of the free fatty acid content of the bonding oils upon the friction characteristics of the friction elements tested.

It should be noted, in this connection, that the temperature upon the friction surface of the friction elements tested was in all cases kept below, or not allowed to rise substantially above, 500° F., and such temperatures were, in general, maintained within the range of 450° F. to 500° F. This range of temperatures was employed for the reason that the effect of specific ingredients upon friction characteristics of friction elements is most noticeable below temperatures of 500° F. This is for the reason that if friction elements are subjected to temperatures substantially in excess of 500° F., upon their friction surfaces, for substantial periods of time, the ingredients thereof, and particularly the organic ingredients, tend to undergo decomposition and the specific effects imparted thereby to the friction characteristics of such friction elements are difficult to ascertain.

Referring specifically to Fig. 1, here is shown a group of graphs illustrating the results of a so-called "fade" test which was one of a series of tests upon certain friction elements and wherein the decelerations were effected under a constant hydraulic pressure of about five hundred pounds per square inch, each deceleration in the tests having been made from an operating speed of about forty miles per hour. Prior to initiation of the tests, the results of which are shown in Fig. 1, each friction element was run in by effecting a large number of decelerations, the number of decelerations being the same in so far as each element was concerned. Thus, the elements were subjected to severe service prior to the initiation of the tests and as a result of this the inherent frictional characteristics of the elements, which initially were substantially alike, were somewhat changed.

The graph which is identified as 1 in Fig. 1 shows the results of the first of a series of successively effected decelerations in which the entailed friction elements included as the bond thereof a so-called purely heat-polymerized vegetable drying oil (linseed) having an acid number of 1.18 and from which bonding oil substantially all of the free fatty acids were removed as formed during the heat-polymerizing operation so that the resulting oil had a viscosity of 41,800 centipoises and a bubble viscosity of 16 minutes, 15 seconds, at a temperature of 26.7° C.

The graphs which are identified as 2 to 4, inclusive, in Fig. 1 show the results of successively effected decelerations in which the entailed friction elements embodied bonds of the present invention, that is to say, these bonds were heat-polymerized vegetable drying oils in which substantially all of the free fatty acids formed in the oils during the operation of heat-polymerizing the oils were allowed to remain in or were retained in the oil as they were formed. Thus the friction elements to which graph 2 in Fig. 1 pertains included as the bond thereof a heat-polymerized vegetable drying oil (linseed) having an acid number of 7.7 and a viscosity of 42,700 centipoises and a bubble viscosity of 19 minutes, 15 seconds, at a temperature of 26.7° C. The friction elements to which graph 3 in Fig. 1 pertains included as the bond thereof a heat-polymerized vegetable drying oil (linseed) having an acid number of 13.6 and a viscosity of 41,800 and a bubble viscosity of 17 minutes, 53 seconds at a temperature of 26.7° C., and the friction elements to which graph 4 in Fig. 1 pertains included as the bond thereof a heat-polymerized vegetable drying oil (linseed) having an acid number of 16.3 and a viscosity of 36,900 centipoises and a bubble viscosity of 16 minutes, 22 seconds at a temperature of 26.7° C.

The decelerations or stops, the results of which are shown in graphs 1 to 4 of Fig. 1, were effected one after the other, which is to say, in so far as a particular graph is concerned, and after an established and corresponding interval the testing machine was again set in operation and when an operating speed of forty miles per hour had been established and maintained, another deceleration was effected.

It is to be remembered that graph 1 in Fig. 1 pertains to a friction element having as the bond thereof a so-called purely (heat) polymerized vegetable drying oil from which substantially all of the free fatty acids were removed as formed during the heat-polymerizing operation, and a bond of this character does not exhibit the controlled lubricating effect exhibited by the bonds to which this invention pertains and this is particularly true in the latter stages of a deceleration and under the severe conditions under which the tests, of which the results are graphically shown in Fig. 1, were conducted. On the contrary, a friction element so bonded tends to exhibit an increase in friction as each deceleration proceeds and also as progress is made from one deceleration to another, and this is believed to result from deterioration of the bond by reason of the increasingly higher temperatures to which it is subjected in service. The fact that there is an increase in friction, believed to be attributable to deterioration of bond by reason of the subjecting of the bond to increasingly higher temperatures, is apparently due to lack of a lubricating effect and this accrues because of the absence of free fatty acids in the oil used as the bond in the friction elements to which graph 1 in Fig. 1 pertains.

In contradistinction to this, each of graphs 2 to 4, inclusive, in Fig. 1 shows that the friction elements to which these graphs pertain and which were bonded with heat-polymerized vegetable drying oils having a relatively high free fatty acid content by reason of the fact that the free fatty acids formed therein during the heat-polymerizing operation were permitted to remain or were retained therein during the heat-polymerizing operation. It is by reason of this high free fatty acid content that the friction elements to which graphs 2 to 4 pertain exhibit a tendency for the friction thereof to decrease not only as each deceleration is effected but also as progress is made from one deceleration to another. The decrease in friction exhibited by these elements is attributed to the presence of the relatively high free fatty acid content in the bonds of these friction elements for it is this that enables a lubricating effect to be realized and it is this lubricating effect that causes the elements to exhibit a decrease rather than an increase in friction as in the instance of the friction element to which graph 1 in Fig. 1 pertains.

The controlled lubricating effect and consequent decrease in friction exhibited in graphs 2 to 4 in Fig. 1 may also be seen by reference to the graphs included in Fig. 2. The graphs numbered 1B to 4B, inclusive, in Fig. 2 pertain to precisely the same friction elements as do graphs 1 to 4, inclusive, respectively, in Fig. 1.

It will be noted, however, that the graphs which are illustrated in Fig. 2 show the results of so-called hot drum wear tests upon friction elements which were conducted subsequent to the tests the results of which are shown in Fig. 1. In conducting the tests, the results of which are shown in Fig. 2, the operating conditions of temperature, etc., were similar to those prevailing when making the tests the results of which are shown in Fig. 1. However, these tests were conducted under varying hydraulic line pressures to secure the desired deceleration. Each deceleration was effected from an operating speed of about thirty miles per hour and each graph in Fig. 2 represents the results of a large number of decelerations.

The graphs identified as 1C to 4C, inclusive, in Fig. 3, respectively, pertain to the same specimens of friction elements as do graphs 1 to 4, inclusive, in Fig. 1 and graphs 1B to 4B, inclusive, respectively, in Fig. 2. Each of these graphs 1C to 4C show the average results of numerous repeated so-called hot drum wear tests made upon the same specimens of friction elements the results of tests upon which are shown in Figs. 1 and 2, but subsequent thereto, and under operating conditions substantially identical to those which prevailed in making the tests the results of which are shown in Fig. 2 but differing therefrom in that each deceleration was effected from an operating speed of approximately sixty miles per hour.

In contradistinction to the friction characteristics exhibited by the friction elements to which graphs 1, 1B and 1C in Figs. 1, 2 and 3, respectively, pertain, the friction elements to which graphs 2, 3 and 4, 2B, 3B and 4B, and 2C, 3C and 4C pertain exhibited a tendency toward a decrease in friction, not only as the later stages of a particular deceleration were approached but also as progress was made from deceleration to deceleration. However, the fact that the friction elements to which graphs 2, 3, 4, 2B, 3B, 4B, 2C, 3C and 4C pertain failed to exhibit an increase in friction and, on the contrary, continue to exhibit a decrease in friction, which is attributable to the lubrication afforded by the relatively high free fatty acid content in the bonds of these friction elements, is taken as being indicative of the fact that the relatively high free fatty acid content of the bonding oils employed in such friction elements afforded such lubrication that an increase in temperature was avoided, that detrimental deterioration of the bond was avoided, and particularly internal disintegration of the friction elements by reason of progressively inward disintegration was avoided.

It is important to note, when reference is made herein to a heat-polymerized vegetable drying oil having a relatively high free fatty acid content, that this is limited to heat-polymerized vegetable drying oils having such a high free fatty acid content by reason of the fact that the free fatty acids formed during the heat-polymerization of the oil are retained in the oil as formed during the heat-polymerizing operation rather than being removed therefrom. Comparable results to those hereinabove explained and which are realized by the use of bonds of the just described character cannot be realized by merely adding free fatty acids to a heat-polymerized vegetable drying oil.

Thus, if extraneous free fatty acid is added to a heat-polymerized vegetable drying oil, such as a so-called purely (heat) polymerized linseed oil from which substantially all of the free fatty acid formed in the oil during the heat-polymerization is removed, the viscosity and tackiness of the oil is substantially reduced. For example, in a typical test 107.6 grams of linseed oil free fatty acids were added to four pounds of so-called purely (heat) polymerized linseed oil from which substantially all of the free fatty acids were removed during the heat-polymerization of the oil, and the addition of linseed oil free fatty acids as aforesaid afforded an oil having an acid number of 12.7 and a viscosity of 33,000 centipoises at a temperature of 26.7° C. However, a heat-polymerized vegetable drying oil, which is heat-polymerized in such a way that the free fatty acids formed in the oil during the heat-polymerization are retained in the oil, exhibits a much higher viscosity. Thus an oil of this character having an acid number of 12.3 had a viscosity of 53,150 centipoises at 26.7° C.

Furthermore, if extraneous free fatty acid is added to a heat-polymerized vegetable drying oil such as a so-called purely (heat) polymerized linseed oil from which the free fatty acids which are formed during the heat-polymerization thereof are removed during the heat-polymerization, such extraneous or added free fatty acid content of the oil resists drying and retards complete curing of the bond so that the acetone soluble and undesirable unpolymerized fraction thereof is relatively high. This, however, is avoided where the heat-polymerized vegetable drying oil employed as a bond in friction elements is of a character wherein the free fatty acids formed during the heat-polymerization of the oil are retained therein, for such an oil not only dries faster than an oil of the aforesaid character to which free fatty acids are added, but also properly cures to a solid state.

The exact reason for this is not known but it is believed to be due in part at least to an action, probably catalytic, of the free fatty acids which are formed in the oil during the heat-polymerization thereof. It is also believed that at least a portion of the free fatty acid content which is formed in the oil during the heat-polymerization thereof combines chemically with the unsatisfied linkages of the glyceryl esters of the oil during the heat-polymerizing operation. This is indicated by the fact that the pure polymer or acetone insoluble fraction of vegetable drying oils such as linseed oil in which the free fatty acids formed during the heat-polymerizing are allowed to remain or are retained in the oil during heat-polymerization possess a noticeably higher acid number and molecular weight than the polymer fraction of vegetable drying oils from which the free fatty acids are removed as formed during the heat-polymerizing of the oil.

Thus the acid number of the polymer fraction of a vegetable drying oil (linseed) in which substantially all of the free fatty acid content formed during the heat-polymerizing is allowed to remain is about 6.0 and the molecular weight of the polymer fraction from such oil, in chloroform, is about 8.7 times the molecular weight of the raw linseed oil, whereas the acid number of the polymer fraction of a so-called purely (heat) polymerized vegetable drying oil (linseed) from which substantially all of the free fatty acid content formed during the heat-polymerizing operation is removed therefrom as formed is only about 0.7 and the molecular weight of the polymer fraction of such oil, in chloroform, is only about 6.7 times the molecular weight of the raw linseed oil.

Still another important consideration, however, is that friction elements such as brake linings and the like containing a bond of a so-called purely heat-polymerized vegetable drying oil (linseed) from which substantially all of the free fatty acids formed during the polymerizing operation are removed therefrom as formed and to which extraneous free fatty acid is subsequently added are not nearly as heat-resistant as are friction elements containing a bond of a heat-polymerized vegetable drying oil having substantially the same acid number but in which the acidity is due to the presence of free fatty acids which are allowed to remain in the oil as they are formed during the heat-polymerizing operation. This is probably due to the fact that the extraneous or added free fatty acid resists cure and is therefore present in the finished friction elements in such form that, when the elements are subjected to heat, disintegration of the free fatty acids and resulting disintegration of the entire bond occurs.

In the event sulphur is used to assist the cure of the bond of this invention, both the ester portion of the bond and the free fatty acid content, formed during the heat-polymerization of the oil prior to its use as a bond, become largely converted to a solid state, as evidenced by the acetone extract of the finished element. However, when extraneous free fatty acid is added to a polymerized oil and the cure thereof is assisted by sulphur, that portion of the bond afforded by the added free fatty acid sulphurizes but is not converted to a solid state, as evidenced by the acetone extract of the finished product. This further evidences that the addition of extraneous free fatty acid to a heat-polymerized vegetable drying oil does not enable the desirable results of this invention to be realized.

It is believed that it will be apparent from the foregoing that the advantageous and novel results realized from the present invention accrue by reason of the fact that oils which are employed as bonds are heat-polymerized sufficiently to be rendered highly viscous and tacky without gel formation and while being completely soluble in petroleum thinner and also so as to have a relatively high acid number, but in this connection it is to be noted that the relatively high acid number in these instances must be such as to have been afforded by reason of the retention in the oil of those free fatty acids which are formed therein during the heat-polymerization of the oil.

While we have described a preferred embodiment of our invention, and a preferred composition and method for making the same, it is to be understood that these are capable of variation and modification and we therefore do not wish to be limited to the precise details set forth but desire to avail ourselves of such changes and alterations as fall within the purview of the following claims.

We claim:

1. The method of making a friction element which comprises heating heat-polymerizable vegetable drying oil at a temperature of not substantially less than 500° F. nor substantially more than 600° F. until said oil has become highly viscous and tacky but is substantially free of gel formation and is completely soluble in petroleum thinner and has an acid number substantially in excess of 2.5, intimately mixing the thus heat-polymerized vegetable drying oil as a bonding agent with friction material, forming the mixture thus prepared into friction element shapes, and then heating said friction element shapes to effect the cure of the bond.

2. The method of making a friction element which comprises heating heat-polymerizable linseed oil at a temperature of not substantially less than 500° F. nor substantially more than 600° F. until said oil has become highly viscous and tacky but is substantially free of gel formation and is completely soluble in petroleum thinner and has an acid number substantially in excess of 2.5, intimately mixing the thus heat-polymerized linseed oil as a bonding agent with friction material, forming the mixture thus prepared into friction element shapes, and then heating said friction element shapes to effect the cure of the bond.

3. A molded friction element for use upon vehicular brakes and the like comprising a substantially homogeneous mixture of friction material and the heat-reaction product of sulphur and a heat-polymerized vegetable drying oil selected from the group consisting of heat-polymerized linseed oil and heat-polymerized perilla oil which is highly viscous and tacky but substantially free of gel formation, soluble in petroleum naphtha, and having an acid number due to its own innate free fatty acid content formed in situ therein of substantially in excess of 2.5, said friction element being characterized by a decline in its coefficient of friction during use as the temperature of said friction element increases.

4. The method of making a friction element which comprises heating a heat-polymerizable vegetable drying oil selected from the group consisting of linseed oil and perilla oil at a temperature of not substantially less than 500° F. nor substantially more than 600° F. until said oil has become highly viscous and tacky but is substantially free of gel formation and is completely soluble in petroleum naphtha and has an acid number of substantially in excess of 2.5, intimately mixing the thus heat-polymerized oil as a bonding agent with sulphur and friction material, forming the mixture thus prepared into friction element shapes, and then heating said friction element shapes to effect the cure of the bond by sulphurization.

CLINTON SHELDON HART.
RAY E. SPOKES.